United States Patent [19]

Millman

[11] Patent Number: 5,678,472
[45] Date of Patent: Oct. 21, 1997

[54] DECOCTION APPARATUS AND METHOD

[76] Inventor: Paul Millman, 201 W. 70th St., New York, N.Y. 10023

[21] Appl. No.: 618,584

[22] Filed: Mar. 20, 1996

Related U.S. Application Data

[60] Provisional application No. 60/010080 Jan. 16, 1996.
[51] Int. Cl.⁶ .................................................. A47J 31/00
[52] U.S. Cl. ........................................... 99/279; 99/321
[58] Field of Search ............................. 99/279, 321, 322, 99/316, 317, 318, 319, 323; 426/597, 433

[56] References Cited

U.S. PATENT DOCUMENTS

| | | |
|---|---|---|
| 1,976,091 | 10/1934 | Pritchett . |
| 2,093,980 | 9/1937 | Linger ........................................ 99/322 |
| 2,343,017 | 2/1944 | Mattoon ..................................... 99/322 |
| 2,995,998 | 8/1961 | Howland . |
| 3,199,437 | 8/1965 | Nelson . |
| 3,517,604 | 6/1970 | Coors . |
| 4,821,630 | 4/1989 | Roberts . |
| 5,318,791 | 6/1994 | Millman et al. . |

*Primary Examiner*—Robert W. Jenkins
*Attorney, Agent, or Firm*—Natter & Natter

[57] ABSTRACT

A brewer and serving carafe for cold water infusion of string suspended tea bags. A frusto-conical diffuser member placed within the carafe includes a tea bag retainer at a lower end adapted for compensating adjustment of the length of the tea bag string to ensure liquid submergence during the brewing procedure. A reservoir at an upper end of the diffuser member simultaneously provides for the selective introduction of flavor enhancing agents and/or taste modifiers that gradually enter into solution.

17 Claims, 4 Drawing Sheets

DECOCTION APPARATUS AND METHOD

CROSS REFERENCE TO RELATED APPLICATION

This application claims the benefit of U.S. Provisional application Ser. No. 60/010,080 filed Jan. 16, 1996.

1. Technical Field

This invention relates generally to a decoction apparatus and method for extraction of an infusion commodity into a water solution.

In particular, the invention concerns an arrangement for accelerating the rate of solution at decreased temperatures with specific application to infusible beverages.

2. Background Art

Infusible beverages generally rely upon a commodity such as tea leaves, ground coffee beans, herbs, bark or similar substances. These substances are commonly packaged within a semi-permeable membrane forming a pouch or bag that is frequently attached to a string. The brewing process involves steeping or soaking the commodity bag in hot or boiling water for decocting the extractive properties as is typically shown in U.S. Pat. Nos. 2,995,998 and 3,517,604.

When it is desired to make an iced beverage using these bags, e.g. iced tea, this requires a multi-step, energy-expending procedure. Water must first be boiled, tea bags must then be steeped in the hot water for a duration of time, usually four to six minutes to achieve a desired strength, the tea bags are then removed and the remaining hot tea is then poured over ice cubes and permitted to stand and/or is refrigerated until it reaches the desired temperature.

Another brewing method involves placement of the tea bags in cooled water, then refrigerating the contents for approximately five hours. The extended brewing time is required for among other reasons that the buoyant force acting upon the tea bags urge the tea bags to float to the free surface of the water, rather than remain submerged and thus reduces the rate of solution.

Another shortcoming of cold water infusion is the relative ineffectiveness of many sweetening agents to readily enter solution without mechanical agitation to hasten equilibrium.

Various attempts have been made for achieving cold water infusion, for example, U.S. Pat. No. 1,976,091 refers to a mellowing process wherein a bag of wood chips is suspended in a beverage for two or three days. U.S. Pat. No. 3,199,437 discusses another infusion apparatus having a water pervious inner bag filled with ground coffee or other material to be extracted. The inner bag is centered within a water impervious outer bag having projections which prevent the inner bag from floating upward. The extraction period for this device has been described as requiring twelve to sixteen hours.

U.S. Pat. No. 4,821,630 describes a sun tea adapter which utilizes a cylindrical insert for confining tea bags within a container of water. The sun tea is typically made by leaving the tea bags in the water out in the sun for several hours. The aforementioned apparatus does not significantly reduce the brewing time.

U.S. Pat. No. 5,318,791 concerns an apparatus for relatively rapid brewing in cool water using tethered tea bags however, the device does not provide range of adjustability to the free length of the tea bag string for controlling extraction efficiency. Furthermore, the device of that patent does not confine the tea bag string tag nor does it remove the tag from immersion within the beverage. The intrusion of the tag is undesirable in appearance and may also provide a source of contamination.

SUMMARY OF THE INVENTION

The nature of this invention involves a decoction apparatus and infusion method for the preparation of beverages especially for brewing iced tea using string-suspended tea bags.

The apparatus includes an open mouth carafe for accommodating a measured quantity of cold water.

A diffuser member is designed for releasable snap-fit engagement over the mouth of the carafe and for selective replacement by a carafe lid when dispensing the brewed beverage.

A tea bag string retainer incorporated in a tag containment compartment is located at one end of the diffuser member. An opposite end of the diffuser member forms a reservoir for introducing auxiliary ingredients such as flavoring agents and/or taste modifiers to the beverage.

A feature of the decoction apparatus of this invention is that the string retainer positions the tea bag for submergence in the water.

Another advantage of the decoction apparatus of this invention is that the tags are isolated from the beverage.

A further benefit of the decoction apparatus of this invention is that the reservoir is centrally deposable within the carafe.

Having thus summarized the invention, it will seen that it is a primary object thereof to provide a decoction apparatus and method of the general character described herein which is not subject to the aforementioned shortcomings, deficiencies and disadvantages.

Another preferred object of this invention is to provide a decoction apparatus and method utilizing a single step, energy-conserving cold water infusion process.

A still further preferred object of this invention is to provide a decoction apparatus and method wherein the tea bags are held continually submerged to accelerate extraction time.

Yet another preferred object of this invention is to provide a decoction apparatus and method wherein the tea bag tags are contained within a compartment to prevent possible adulteration of the beverage.

Another preferred object of this invention is to provide a decoction apparatus and method wherein auxiliary ingredients may be introduced into solution without requiring mechanical agitation.

Yet still another object of this invention is to provide a decoction apparatus that is durable in use, attractive in appearance and simple in design.

Other preferred objects of this invention in part will be apparent and in part will be pointed out hereinafter.

With these ends in view, the invention finds embodiment in certain combinations of elements, arrangements of parts, procedures and modalities by which the aforementioned preferred objects and certain other objects are hereinafter attained, all as more fully described with reference to the accompanying drawings and the scope of which is more particularly pointed out and indicated in the appended claims.

BRIEF DESCRIPTION OF THE DRAWINGS

In the accompanying drawings in which is shown an exemplary embodiment of the invention.

DETAILED DESCRIPTION OF THE INVENTION

With specific reference now to the figures in detail, it is stressed that the particulars shown are by way of example and for the purposes of illustrative discussion of the preferred embodiment and method of the present invention only and are presented in the cause of providing what is believed to be the most useful and readily understood description of the principles and conceptual aspects of the invention. In this regard, no attempt has been made to show the apparatus and process in more detail than is necessary for a fundamental understanding of the invention however, the description, in combination with the drawings, should make apparent to those skilled in the art how the apparatus and process may be applied in practice.

Figure 1:
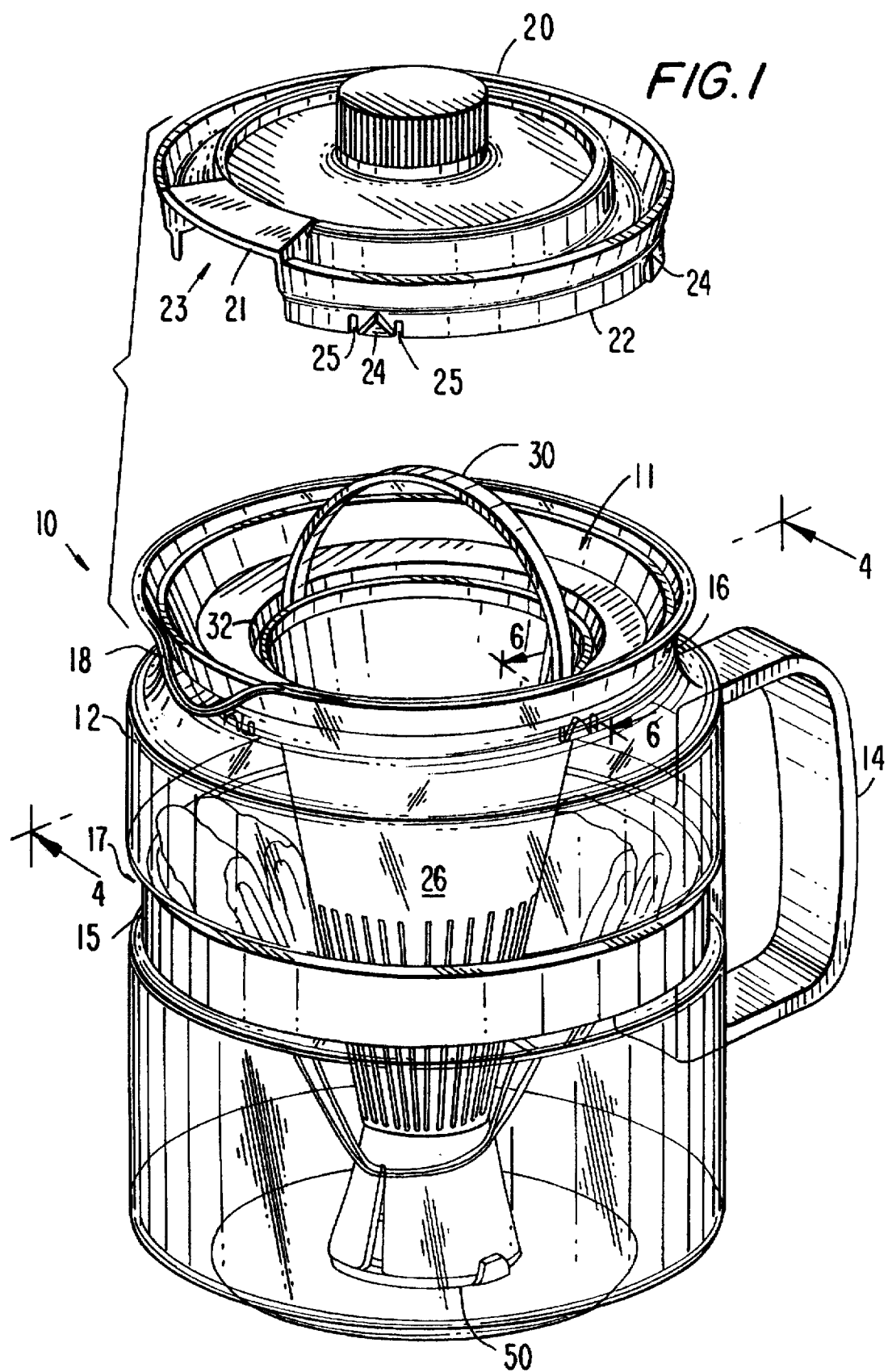
FIG. 1 is a perspective view of the apparatus of this invention showing a carafe, a diffuser member positioned within the carafe and a carafe lid.
Figure 2:
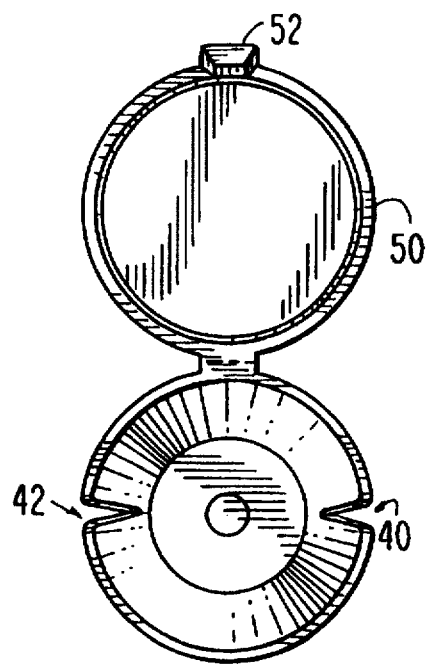
FIG. 2 is an isolated plan view showing a combination tag compartment and string retainer.

Referring now to FIG. 1, there is shown a decoction apparatus 10 including an open mouth vessel, such as a carafe 12. The carafe 12 has a substantial cylindrical configuration defining a mouth 11 and further including a handle 14 secured by a circumferential band 15 accommodated within a conforming recess 17 formed in a wall 19 of the carafe 12. An upper end of the wall 19 is tapered inwardly and progressing further upwardly, is flared outwardly to form a neck 16 surrounding the mouth 11, and also defining a pouring spout 18.

A carafe lid 20 has a depending flange 22 that includes a plurality of tabs 24 defining a generally triangular shaped raised or ridged surface 27. The tabs 24 are formed with a pair of margin slots 25 that provide limited flexure. Additionally, a discontinuity in the flange 22 defines a discharge opening 23 and a horizontal panel defines a flow deflector 21.

Figure 7:
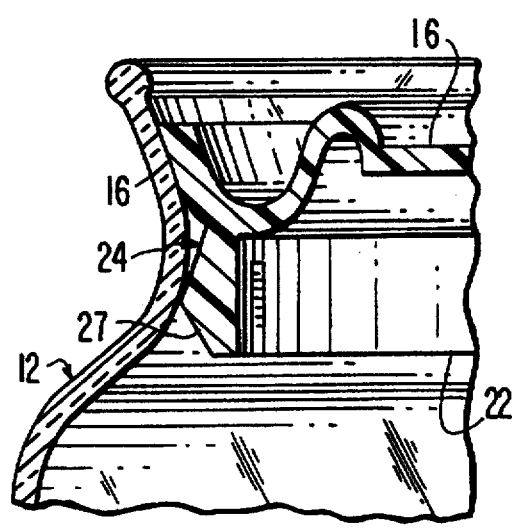
FIG. 7 is a partial sectional view, corresponding to FIG. 6, showing snap-fit engagement of the carafe lid within the neck portion of the carafe.

The lid 20 is seatable over the carafe 12 by a snap-fit action of the tabs 24, displaced inwardly as the ridged surface 27 passes over the neck 16 and then resumes the initial position as shown in FIG. 7. The discharge opening 23 and the flow deflector 21 are registrable with the pouring spout 18.

A diffuser member 26, preferably has a frusto-conical configuration defined by a sloped wall 35 and includes a rim 28 disposed at an upper end thereof. The rim 28 is substantially coincident to the flange 22 and includes a plurality of corresponding tabs 24(a). The diffuser member 26 is seatable within the carafe 12 by a similar snap-fit engagement of the tabs 24(a) within the neck 16 as shown in FIG. 6.

Figure 6:
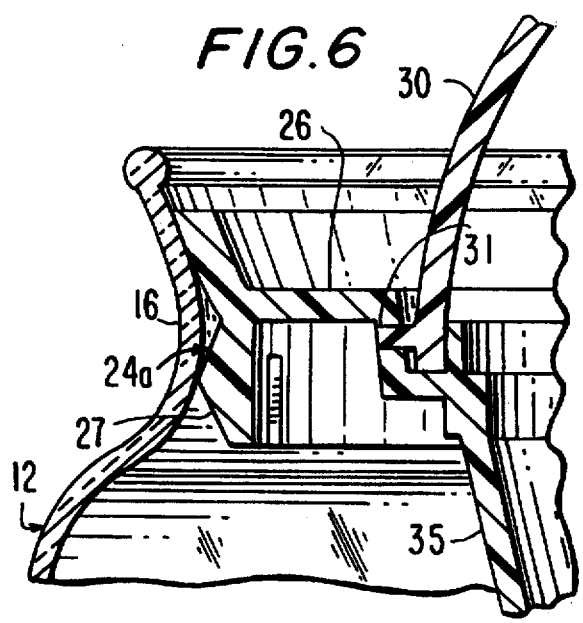
FIG. 6 is a partial sectional view taken substantially along line 6—6 of FIG. 1 showing snap-fit engagement of the diffuser member within a neck portion of the carafe.

Further with regard to the rim 28 and referring to FIGS. 1 and 6, a bail 30 is pivotally mounted therein and functions as a handle for positioning the diffuser member 26 in the carafe 12 and for removing same therefrom. The bail 30 is swingably displaceable about a pivot 31 and is accommodatable, in a storage mode, within a circumferential groove 32.

Figure 4:
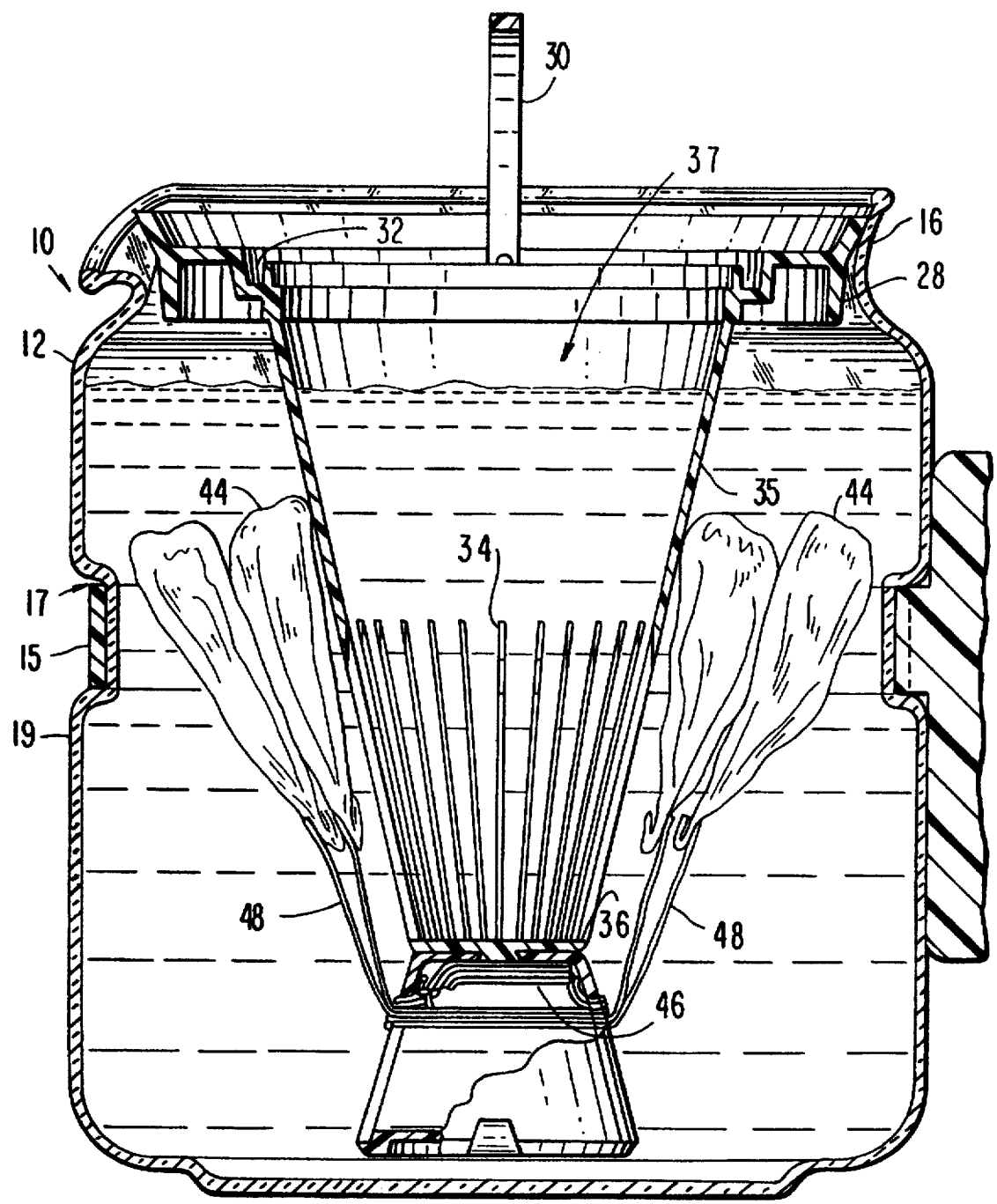
FIG. 4 is a sectional view taken substantially along line 4—4 of FIG. 1 showing the diffuser member and several tethered tea bags during the brewing process.
Figure 5:
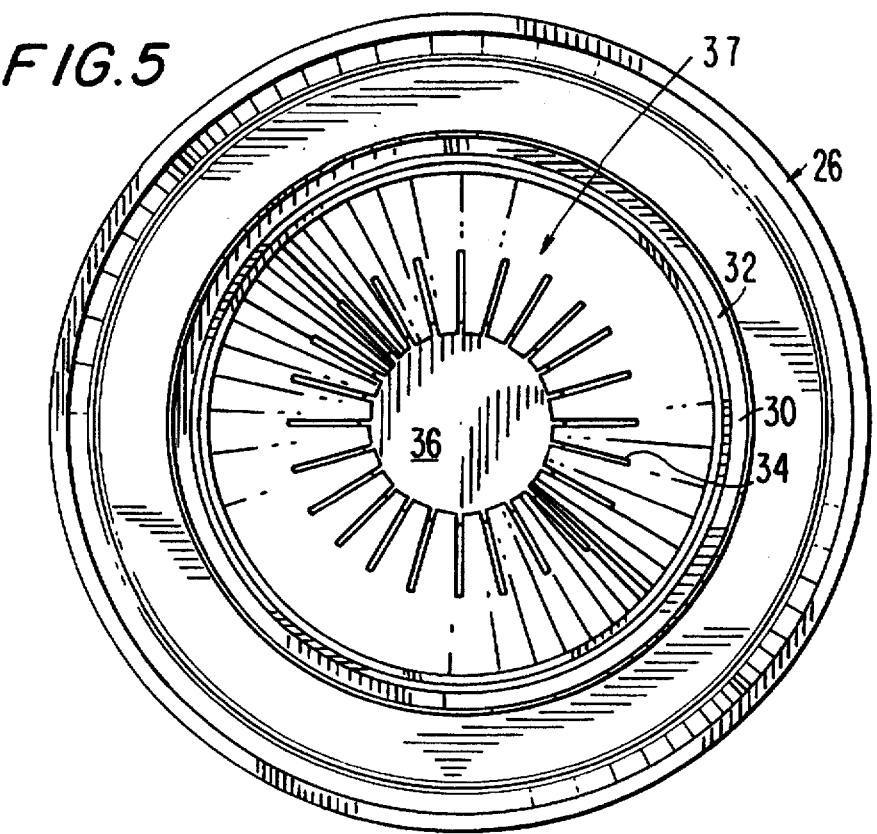
FIG. 5 is a plan view of the diffuser member showing a plurality of diffusion slits and further illustrating a bail receiving groove.

Referring again to the diffuser member 26, there is provided a plurality of longitudinal orifices 34, extending radially within the sloped conical wall 35 as shown in FIGS. 4 and 5. The longitudinal orifices 34 are approximately 4–6 cm in length and about 0.5–1 mm in width. A circular base 36 provides an impervious barrier and the volume between the base 36 and the rim 28 defines a reservoir 37 for receiving auxiliary ingredients for entry in solution. In this regard, the base 36 is spaced from the bottom of the carafe 12 to prevent settlement of the ingredients in the carafe 12 and the orifices 34 allow for gradual entry into solution.

A tag compartment 38 is disposed at a lower end of the diffuser 26. The compartment 38 preferably has a frusto-conical configuration correspondingly inverted with respect to the reservoir 37 and includes a conical wall 39 that defines V-slots 40, 42 for tethering a plurality of tea bags 44 as will be discussed hereinafter. Typically, each of the tea bags 44 is attached to an end of a string 48. A tag 46 is attached to the other end of the string 48.

Figure 3:
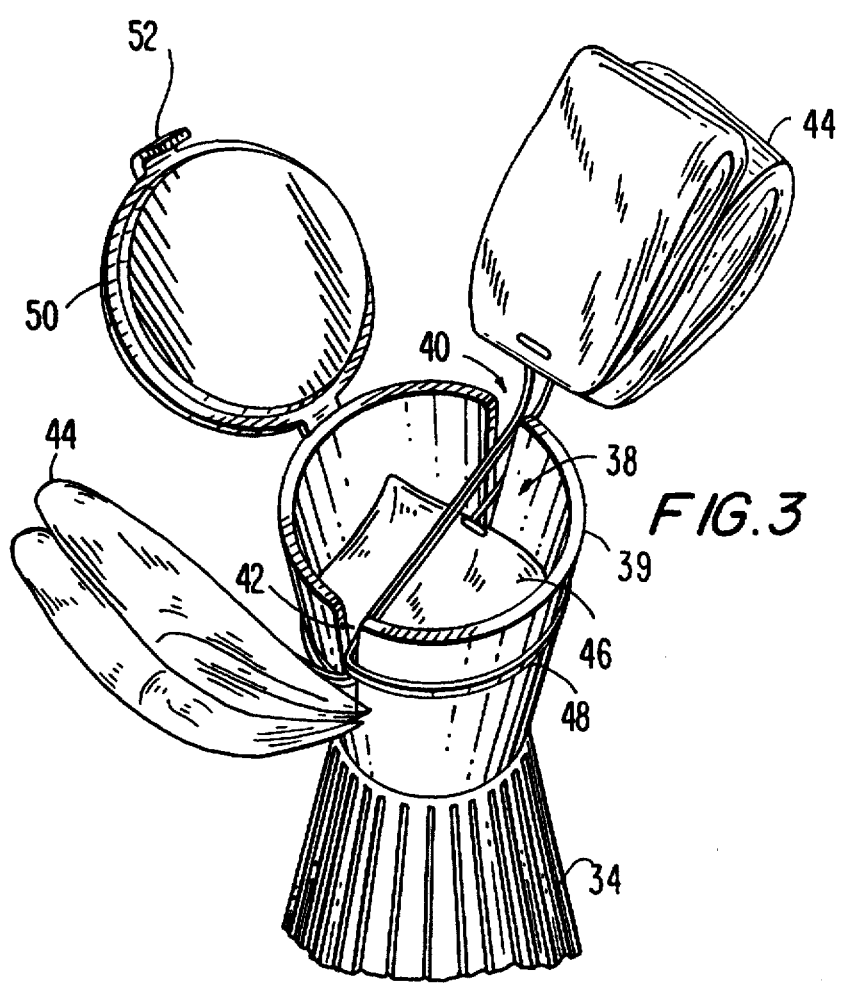
FIG. 3 is a perspective view of the tag compartment including a portion of the diffuser member and illustrating both tag containment and string engagement for anchoring the tea bags.

In accordance with the procedure of this invention, the diffuser member 26 is removed from the carafe 12 and as shown in FIG. 3, the tag 46 is placed within the compartment 38 and the string 48 is threaded through the V-slot 40 and wound semicircularly, in a clockwise direction, around the wall 39, passed through the V-slot 42 and again threaded through V-slot 40. A plurality of tea bags 44 are positionable in this manner. It is preferable to balance the number of tea bags 44 on either side of the diffuser member 26 to achieve uniform dispersion and for that purpose an equal number of tea bags 44 are threaded through V-slot 42 and wound semicircularly, in a clockwise direction, around wall 39, passed through V-slot 40 and again threaded through V-slot 42 (see FIG. 3). Additional V-slots can be incorporated in the wall 39 and other string winding and spool configurations may be employed.

It should further be observed that the typical length of the string 48 is approximately 9 to 15 mm and that the winding of the string 48 around the wall 39 will compensatingly adjust the free string length so that the tethered bag 44 will remain in continuous submersion within the liquid for improved extraction efficiency. If the string 48 is a greater length, an additional number of windings or other winding configurations may be employed and/or if the string is of a shorter length, a winding may not be required for the desired string length for achieving bag submersion. Furthermore, if less liquid is in the carafe 12, a shorter string length may be required.

The compartment 38 further includes a hinged cover 50 provided with a snap-lock 52 that cooperates with a latch or indent (not shown) in the wall 39 in a conventional manner, to secure the cover 50 over tea bag strings 48 as shown in FIG. 4 and to provide a substantially water-tight containment of the tags 46.

By way of example, the carafe 12 may typically be fabricated of glass, such as Pyrex or of a plastic material, e.g. polycarbonate, polypropylene or the equivalent. The carafe lid 20, the diffuser member 26 and the handle 14 can be made of similar plastics. It should also be noted that in the preferred embodiment, the carafe 12 has a 64 ounce capacity and that graduated markings corresponding to specific volumes are placed on the wall 19 of the carafe 12 and on the wall 35 of the reservoir 37.

Further with regard to the method of this invention, a half-gallon of full-strength iced tea would require eight (8) tea bags. The diffuser member 26 is hand-held as shown in FIG. 3; four of the tea bag tags 46 are placed within the compartment 38 and the strings 48 are threaded through the V-slots 40, 42. The process is repeated with the remaining four tea bag tags 46 with the strings 48 threaded in an opposite direction as discussed above. The cover 50 is then closed and snap-locked over the slots 40, 42. The bail 30 is extended as shown in FIG. 1 and the diffuser member 26 is inserted into the carafe 12 which has previously been filled with 64 oz of cold water having a temperature within the range of about 33° F. to 55° F. The tea bags 44 will remain continuously submerged and freely accessible to water-surface contact. The infusion process will be completed within approximately 20 minutes. A flavor enhancer, e.g. cinnamon, chicory, orange peel, and/or a taste modifier, e.g. granulated sugar, artificial sweetener, are then loaded, in premeasured quantities, within the reservoir 37. The flavor enhancer can, for example, be pre-packaged in individual flavor packets.

The reservoir 37 can also be charged with the flavor enhancers and/or the taste modifiers prior to insertion within the carafe 12. These last-mentioned auxiliary ingredients will be simultaneously diffused through the orifices 34 into solution without the need for mechanical agitation during the infusion process. This is achievable, in part, as a result of the longitudinal axial location of the reservoir 37, extending to a depth of approximately from one-half to three-quarters of the heighth dimension of the carafe 12. In this regard, the base 36 supporting the auxiliary ingredients, is displaced from the bottom of the carafe 12 for more rapid migration of the ingredients into solution.

Furthermore, the sloped configuration of the conical wall 35 provides for optimum fluid circulation around the submerged tea bags 44 so as to achieve the desired equilibrium or "strength" within a relatively short time. The process does not require a dunking motion of the tea bags 44 and further removes the tag 46 from the liquid to prevent possible contamination and/or an undesirable presence. Thereafter, the diffuser member 26, together with the attached tea bags 44 are removed from the carafe 12 and the lid 20 is placed over the carafe 12 wherein the beverage is ready for dispensing and consumption.

It should thus be seen that there is provided a decoction apparatus and method which achieves the various objects of this invention and which is well adapted to meet conditions of practical use.

Since various possible embodiments and variations in the process might be made to the exemplary embodiments and procedures set forth, it is to be understood that the apparatus and process shown and described should be interpreted as illustrative and not in a limiting sense.

Having thus described the invention, there is claimed as new and desired to be secured by Letters Patent:

1. A decoction apparatus suitable for the preparation of beverages using an infusion bag attached to one end of a length of string and a tag attached to another end of the string and comprising an open mouth vessel for accommodating a measured quantity of liquid, diffuser means seatable within the mouth of the vessel, said diffuser means including a reservoir at one end and retainer means at an opposite end, said retainer means being adapted for engaging and selectively adjusting the string length for submerged tethering of the infusion bag within the liquid.

2. A decoction apparatus as claimed in claim 1 wherein the retainer means includes a compartment for containment of the tag.

3. A decoction apparatus as claimed in claim 1 wherein the retainer means further includes winding means for adjusting the string length.

4. A decoction apparatus as claimed in claim 3 wherein the winding means comprises slot means in the retainer means for threadably receiving the string.

5. A decoction apparatus as claimed in claim 2 wherein the compartment includes a cover member, said cover member being displaceable over the winding means for securing the string and the tag.

6. A decoction apparatus as claimed in claim 1 wherein the reservoir is adapted for insertion in the vessel along a longitudinal central axis to a depth of approximately one-half to three-quarters of the heighth dimension of the vessel.

7. A decoction apparatus as claimed in claim 1 wherein the reservoir defines a plurality of longitudinal orifices, said orifices providing for liquid transfer between the reservoir and the carafe.

8. A decoction apparatus as claimed in claim 1 wherein the reservoir is adapted for receiving at least one of a flavor enhancer and a taste modifier for simultaneous introduction into liquid solution.

9. A decoction apparatus as claimed in claim 1 wherein the reservoir includes rim means at an upper edge thereof, said rim means being adapted for cooperative engagement with a neck surrounding the mouth of the vessel.

10. A decoction apparatus comprising a carafe adapted for containing a liquid, said carafe having a neck portion defining a mouth of the carafe, a carafe lid adapted for selective placement over the mouth, a diffuser member seatable within the carafe, retainer means disposed at one end of the diffuser member for positioning an infusible substance in continuous liquid submersion, said diffuser member further defining a reservoir at another end thereof for receiving and selectively introducing auxiliary ingredients into liquid solution, said diffuser member having a rim element at an upper end, said rim defining at least one yieldable rim tab adapted for engagement with the neck portion of the carafe, said carafe lid having a flange substantially coincident to the rim, said flange defining at least one yieldable lid tab substantially corresponding to the rim tab whereby the diffuser member and the lid member may be interchangeably seated over the mouth of the carafe.

11. A decoction apparatus as claimed in claim 10 wherein the reservoir has a frusto-conical configuration and is centrally positionable within the carafe for releasing the auxiliary ingredients into solution.

12. A decoction apparatus as claimed in claim 10 wherein the infusible substance is confined within a string suspended bag, said string having a tag attached at one end and the bag secured to an opposite end thereof, wherein the retainer means includes a compartment disposed at a lower end of the diffuser member, said compartment being adapted for accommodating the tag.

13. A decoction apparatus as claimed in claim 12 wherein the compartment defines an opening formed by a circumferential wall having an edge with at least one slot therein, said slot being adapted for threadably receiving the string.

14. A decoction apparatus as claimed in claim 13 further including a cover adapted for engagement with the edge of the compartment wall for securing the string.

15. A decoction apparatus as claimed in claim 14 wherein the compartment includes a plurality of slots for providing a string threadable configuration for compensatingly adjusting the free length of the string so as to maintain the bag in liquid submersion.

16. A decoction apparatus as claimed in claim 10 wherein the diffuser member includes a bail for facilitating placement within and removal from the carafe.

17. A decoction apparatus as claimed in claim 16 wherein the bail is swingably displaceable into a storage accommodation mode within the rim element.

* * * * *